United States Patent
Heuer et al.

(10) Patent No.: US 8,873,646 B2
(45) Date of Patent: Oct. 28, 2014

(54) METHOD AND DEVICES FOR ESTABLISHING COMMUNICATION BETWEEN A FIRST STATION AND A SECOND STATION

(75) Inventors: Jörg Heuer, Oberhaching (DE); Anton Schmitt, Vaterstetten (DE); Martin Winter, Rosenheim (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 13/505,080

(22) PCT Filed: Aug. 31, 2010

(86) PCT No.: PCT/EP2010/062719
§ 371 (c)(1),
(2), (4) Date: Jul. 8, 2012

(87) PCT Pub. No.: WO2011/051021
PCT Pub. Date: May 5, 2011

(65) Prior Publication Data
US 2012/0263242 A1    Oct. 18, 2012

(30) Foreign Application Priority Data
Oct. 30, 2009   (DE) .................. 10 2009 051 401

(51) Int. Cl.
*H04B 3/00* (2006.01)
*B60L 11/18* (2006.01)

(52) U.S. Cl.
CPC ............. *B60L 11/1824* (2013.01); *Y02T 90/14* (2013.01); *B60L 11/1818* (2013.01); *Y02T 10/7088* (2013.01); *Y02T 90/121* (2013.01); *Y02T 90/16* (2013.01); *Y02T 10/7005* (2013.01)
USPC .......................................... 375/257; 375/316

(58) Field of Classification Search
USPC ................................................. 375/257, 316
See application file for complete search history.

(56) References Cited

U.S. PATENT DOCUMENTS 7,847,518 B2   12/2010   Ichikawa et al. .............. 320/109
8,415,918 B2    4/2013   Tonegawa ..................... 320/109
(Continued)

FOREIGN PATENT DOCUMENTS

| CN | 101355259 A | 1/2009 | ............ H01M 10/44 |
| JP | 2004222176 A | 8/2004 | ............. B60L 11/18 |

(Continued)

OTHER PUBLICATIONS

International PCT Search Report and Written Opinion, PCT/EP2010/062719, 11 pages, Dec. 15, 2010.

(Continued)

*Primary Examiner* — Eva Puente
(74) *Attorney, Agent, or Firm* — King & Spalding L.L.P.

(57) ABSTRACT

Methods and devices that establish communication between a first station and a second station are provided. To this end, an identifier, which identifies the first station and the second station as communication partners for communication, is transmitted between the first and second stations on a first partial connection. After receiving the identifier, communication is started between the first and second stations via a communication connection, wherein the transmission of the identifier via the first partial connection and the communication connection are based on different physical connections. The methods and systems can be used for loading or unloading processes of electrical vehicles, such as autonomous systems in the hospital field, or for vehicles for personal transportation. The methods and systems may provide reliable and cost-effective communication between the first and second stations.

16 Claims, 3 Drawing Sheets

(56) References Cited

U.S. PATENT DOCUMENTS

| | | | |
|---|---|---|---|
| 2002/0158749 A1* | 10/2002 | Ikeda et al. | 340/5.74 |
| 2008/0040223 A1* | 2/2008 | Bridges et al. | 705/14 |
| 2009/0027010 A1 | 1/2009 | Ha et al. | 320/138 |
| 2010/0010698 A1 | 1/2010 | Iwashita et al. | 701/22 |
| 2010/0231160 A1* | 9/2010 | Shaffer et al. | 320/101 |
| 2012/0263242 A1 | 10/2012 | Heuer et al. | 375/257 |

FOREIGN PATENT DOCUMENTS

| | | | | |
|---|---|---|---|---|
| JP | 2007174426 A | 7/2007 | | H02M 9/00 |
| JP | 2008042984 A | 2/2008 | | H02J 13/00 |
| JP | 2008043040 A | 2/2008 | | B60L 11/18 |
| JP | 2009165301 A | 7/2009 | | B60L 11/18 |
| JP | 2009171700 A | 7/2009 | | B60L 11/18 |
| WO | 2008/073453 A1 | 6/2008 | | B60L 11/18 |
| WO | 2009/098687 A2 | 8/2009 | | H02J 7/10 |
| WO | 2011/051021 A1 | 5/2011 | | B60L 11/18 |

OTHER PUBLICATIONS

Chinese Office Action, Application No. 201080048701.2, 16 pages, Feb. 28, 2014.

* cited by examiner

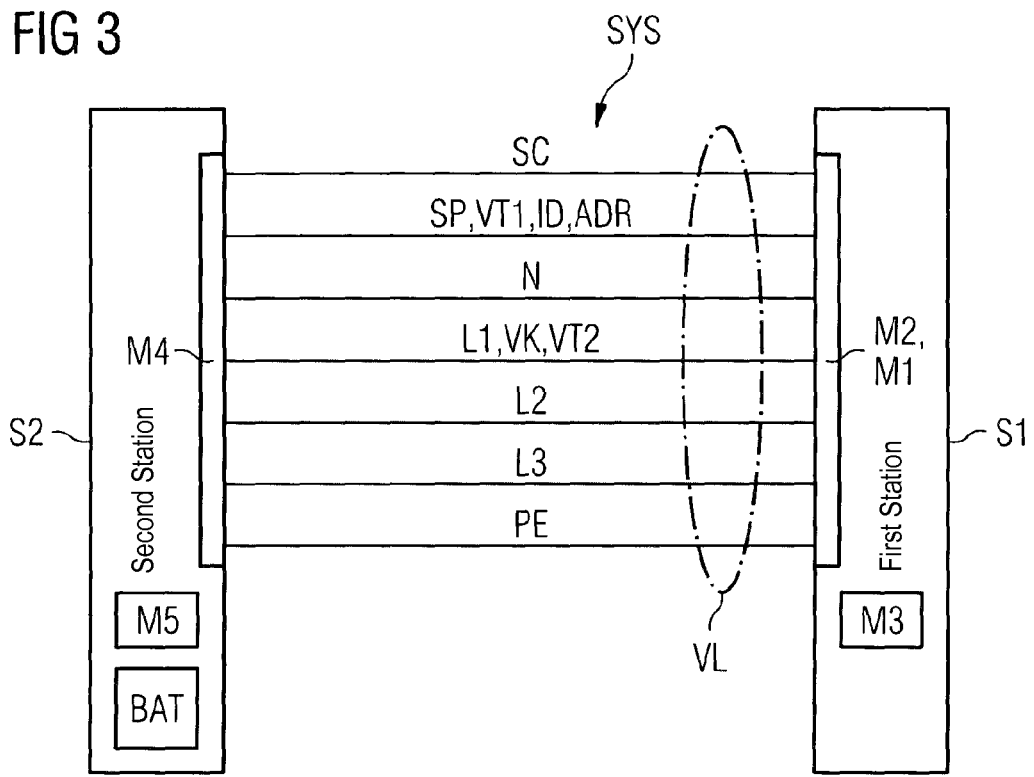
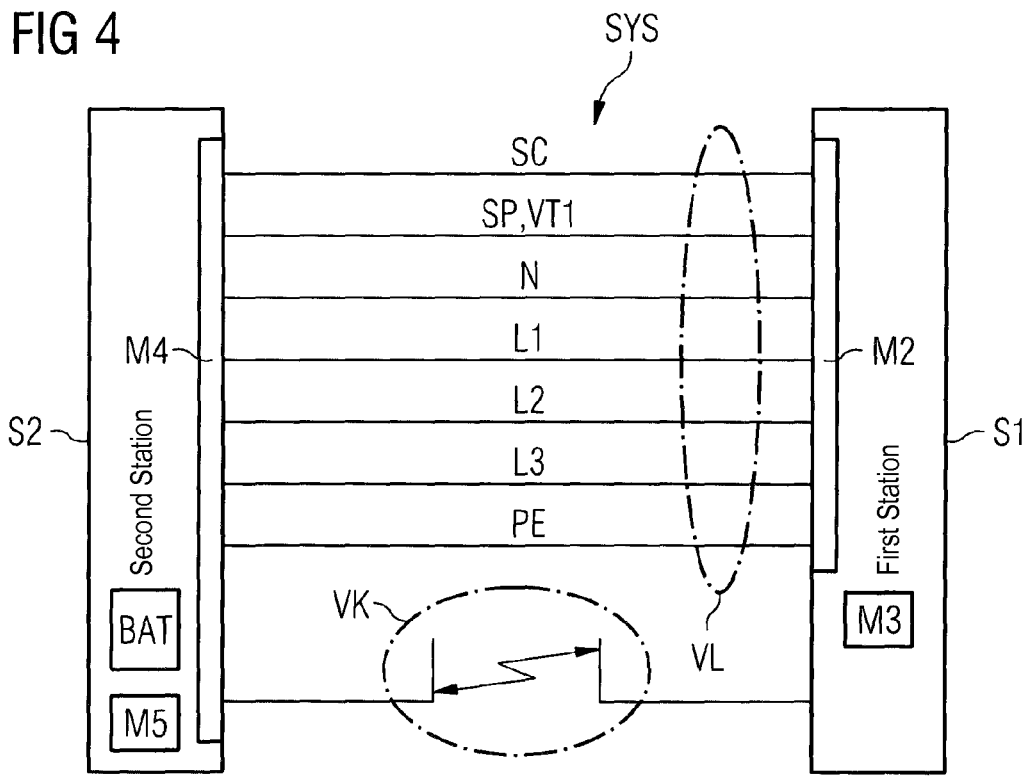

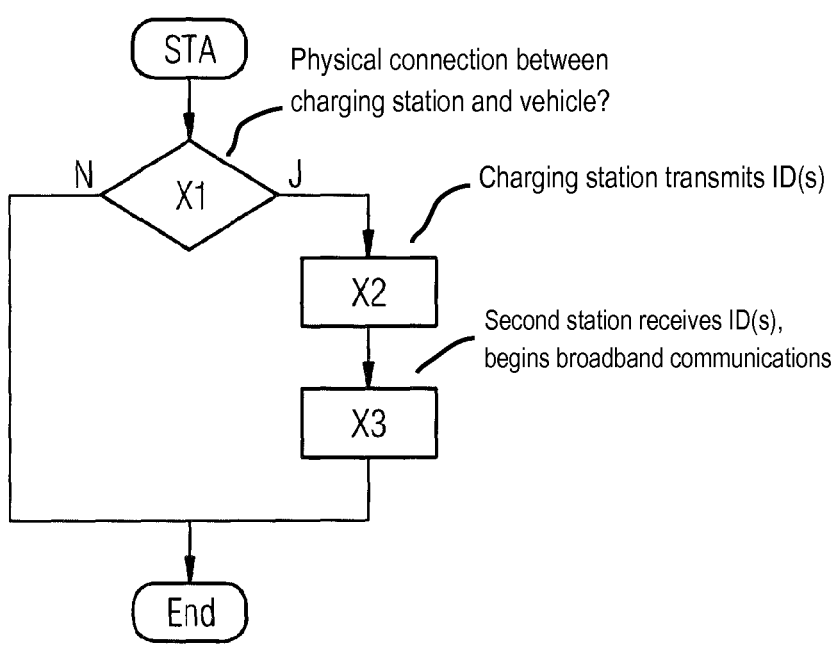

METHOD AND DEVICES FOR ESTABLISHING COMMUNICATION BETWEEN A FIRST STATION AND A SECOND STATION

CROSS-REFERENCE TO RELATED APPLICATIONS

This application is a U.S. National Stage Application of International Application No. PCT/EP2010/062719 filed Aug. 31, 2010, which designates the United States of America, and claims priority to DE Patent Application No. 10 2009 051 401.5 filed Oct. 30, 2009. The contents of which are hereby incorporated by reference in their entirety.

TECHNICAL FIELD

The disclosure relates to methods and devices for establishing communication between a first station and a second station.

BACKGROUND

Development work on electric vehicles and the infrastructure thereof has been underway for a long time. In this context, there is a need to standardize a charging cable, i.e., a charging connection, between the electric vehicle and a charging station for charging a battery of the electric vehicle. FIG. 1 shows an example of the vehicle to be charged as station S2, the charging column as station Sl and the charging connection. In connection with this standardization, the ISO/IEC (ISO=International Standardisation Organisation, IEC=International Electrotechnical Commission) is currently compiling a document IEC 61851-1 Annex A.

FIG. 2 shows an example of a plug PLG of the charging connection VL, which is introduced into a matching counterpart on the electric vehicle. The individual conductors for the plug are physically separate partial connections, each embodied, for example, as a copper cable with an insulating sheath. Here, the individual contacts designate the following functions:

LI, L2, L3: Three outer conductors
N: Neutral conductor
PE: Ground conductor, potential to ground
SC: Control conductor
SP: Signaling conductor The combination of the conductors LI, L2, L3, PE and N forms a plug which is used for industrial purposes to connect three-phase machines and is defined as Standard IEC 60309. The contact SC (Control Pilot) only indicates whether the plug PLG of the charging connection VL has been inserted in the socket on the vehicle and hence there is a physical connection between the station 1 and the station 2. The signal conductor SP (proximity) is used for the exchange of basic information. Document IEC 61851-1 Annex A suggests the provision of pulse-width modulation (PWM) with which "low level" signaling can be performed on the signal conductor SP. Consideration is also being given to a broadband communication connection via one of the outer conductors LI, L2, L3 with the aid of PLC technology (PLC=Power Line Communication).

Hitherto, it was assumed that signal level analysis can be used to establish whether a charging connection exists, i.e. the charging cable is connected to the vehicle. However, with the increasingly broad bandwidths of PLC connections, this is very unreliable and, at the high currents typically required for the charging process, may require large and expensive components, such as, for example inductors.

SUMMARY

In one embodiment, a method is provided for establishing communication between a first station and a second station, wherein the first station is connected directly to the second station via a charging connection for charging or discharging a memory unit of the second station. The method comprises transmitting at least one identifier via a first partial connection of the charging connection, wherein the identifier identifies the first station and the second station as communication partners for communication, and after receiving said identifier, starting the communication using the identifier via a communication connection for performing the communication between the first station and the second station, wherein the first partial connection and the communication connection are different physical connections.

In a further embodiment, the identifier is transmitted from the first station to the second station. In a further embodiment, the identifier is transmitted from the second station to the first station. In a further embodiment, the identifier is created in the form of an address of the first station and/or the second station. In a further embodiment, the address is created in the form of an IP address, a service set identification, a MAC address or a network segment address. In a further embodiment, the identifier is transmitted after the establishment of the charging connection. In a further embodiment, the first partial connection of the charging connection is established on the basis of a pulse-width modulated signal, a frequency-modulated signal, an amplitude-modulated signal or a phase-shift-key modulated signal. In a further embodiment, the communication connection is established on the basis of a wireless connection or a wire-bound connection. In a further embodiment, the communication connection is created on the basis of at least one second partial connection of the charging connection, wherein the at least one second partial connection is embodied to transmit energy for charging or discharging the memory unit. In a further embodiment, the identifier is transmitted in encoded form. In a further embodiment, key information is transmitted via the first partial connection.

In another embodiment, a transmission system is provided for establishing communication with a first station and with a second station, wherein the first station is connected directly to the second station via a charging connection to charge or discharge a memory unit of the second station. The system comprises a first partial connection of the charging connection for transmitting at least one identifier, wherein the identifier identifies the first station and the second station as communication partners for communication; and a communication connection for performing the communication between the first station and the second station, wherein the communication can be started after receiving the identifier by the first station or by the second station using the identifier. The first partial connection and the communication connection are different physical connections.

In yet another embodiment, a first station is provided for establishing communication between the first station and a second station, wherein the first station is connected directly to the second station via a charging connection for charging or discharging a memory unit of the second station. The first station comprises means for transmitting at least one identifier via a first partial connection of the charging connection, wherein the identifier identifies the first station and the second station as communication partners for communication, and means for performing the communication between the first station and the second station via a communication connection, wherein the communication can be started after receiving the identifier by the first station or by the second station using the identifier, wherein the first partial connection and the communication connection are different physical connections.

In yet another embodiment, a second station is provided establishing communication between a first station and the second station, wherein the first station is connected directly to the second station via a charging connection for charging or discharging a memory unit of the second station. The second station comprises means for transmitting at least one identifier via a first partial connection of the charging connection, wherein the identifier identifies the first station and the second station as communication partners for communication, and means for performing the communication between the first station and the second station via a communication connection, wherein the communication can be started after receiving the identifier by the first station or second station using the identifier, wherein the first partial connection and the communication connection are different physical connections.

BRIEF DESCRIPTION OF THE DRAWINGS

Example embodiments will be explained in more detail below with reference to figures, in which:

FIG. 3 illustrates a transmission system, a first and second station according to a first example embodiment;

FIG. 4 illustrates a transmission system, a first and second station according to a second example embodiment FIG. 5 is a flowchart for describing a method according to an example embodiment.

DETAILED DESCRIPTION

Figure 1:
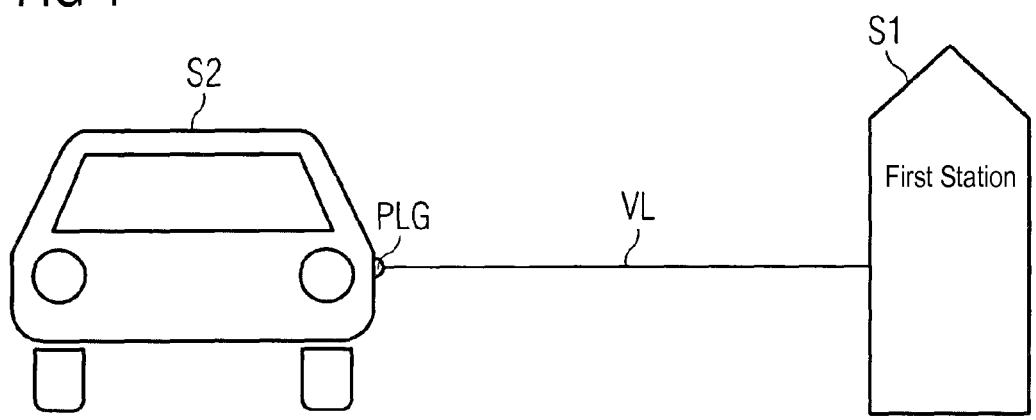
FIG. 1 illustrates a transmission system comprising a first and second station and a charging connection.

Some embodiments provide methods and devices with which a connection between the second station, for example embodied as an electric vehicle, and a first station, for example embodied as a charging column, can be established in a reliable way and by means of an inexpensive implementation.

For example, some embodiment provide a method for establishing communication between a first station and a second station, wherein, for charging or discharging a memory unit of the second station, the first station is connected directly to the second station via a charging connection, at least one identifier is transmitted via a first partial connection of the charging connection, wherein the identifier identifies the first station and the second station as communication partners for communication, after receiving the identifier, communication is started between the first station and the second station via a communication connection for performing the communication and the first partial connection and the communication connection are different physical connections.

One aspect is the fact that the identifier, which may be required for establishing communication, in particular broadband communication between the first and second station, and the subsequent communication connection, which is started on the basis of the identifier, are based on different physical connections. For example, the first partial connection of the charging connection is connected directly to the first and the second station. In this context, "directly" means that, with respect to the first and second station, it is ensured that the identifier cannot be transmitted or received by a third station. "Directly" also means that the exchange of the identifier takes place via a first partial connection of the charging connection and not via a connection different from the charging connection.

In this context "charging connection" should be understood to mean that the charging connection represents one or more physical connections between the first and the second station, which is provided for charging the memory unit, for example a battery of the second station. Here, the charging connection can, for example, comprise a charging cable connecting the first and second station permanently to each other. Alternatively, the charging connection can also be understood to be an inductive coupling between the first and the second station, which, for purposes of energy transmission, connects the first station directly to the second station.

Moreover, the term "physical connection" should be understood as meaning, that, for example, when using a charging cable for the charging connection, the first partial connection and the communication connection are implemented on different partial connections of the charging cable. When an inductive coupling is used as the charging connection, the first partial connection and the communication connection are physically separated, for example by amplitude or frequency modulation. Generally, the physical connection represents a basic physical information transfer process, such as, for example, the amplitude modulation of a carrier signal, which is emitted and received via an antenna. Consequently, the physical connection describes the transmission medium used and the method by which the information is then impressed, such as, for example, the modulation of a medium or carrier. A further embodiment of the feature of different physical connections can be such that the first partial connection is wire-bound and the communication connection is executed wirelessly.

The charging connection should be understood to mean a physical connection, for example by means of a charging cable, enabling the charging or discharging of a battery of the second station.

If the identifier is transmitted from the first station to the second station, the first station can transmit information for establishing communication for a network belonging to the first station as an identifier.

Alternatively, the identifier can be transmitted from the second station to the first station. This has inter alia the advantage that the identifier can also transmit an identification of the second station to be connected to the first station. This identifier is, for example, used to authorize access to the first station.

In a further embodiment, the identifier can be created in the form of an address of the first station and/or the second station. The address can be used to specify not only the communication of the communication partners but also at least one of the actual communication partners. Preferably, an IP address, a service certification, a MAC address or a network segment address is used as the address. The IP address (IP=Internet Protocol) is standardized by the ITF (ITF=Internet Engineering Task Force). The service set identification describes a network identification for unique identification, for example known from WLAN IEEE 802.11 (WLAN=Wireless Local Area Network, IEEE=Institute for Electric and Electronics Engineers). In the case of internet-based communication, the MAC address (MAC=Media Access Control) specifies a unique identification of the first and/or second station. The MAC address is used in the OSI Layer Model (OSI=Open Systems Interconnection) in a Layer-2 communication, for example with bridging. Finally, a network segment address designates a delimited network in which the communication can be performed, for example a network delimited by bridges at Layer 2 of the OSI Layer Model.

In a further embodiment, the identifier is transmitted after the establishment of the charging connection. This may ensure that the transmission only takes place when the charging connection between the first and second station physically exists.

In addition, the start of the communication connection can be made dependent on a further signaled state. In a document currently undergoing standardization, IEC 61851-1 Annex A from the ISO/IEC (ISO=International Organisation for Standardization, IEC=International Electrotechnical Commission), after the establishment of the charging connection, an operating mode 3, for example, modulated by means of pulse-width modulation PWM, is transmitted on the signal conductor, which indicates that both a charging process and communication are to be started. Hence, the start of the communication connection is only to be initiated after reception of the identifier and the operating mode 3.

The first partial connection of the charging connection is established on the basis of a pulse-width-modulated signal, a frequency-modulated signal, an amplitude-modulated signal or a phase-shift-modulated signal. All these modulation methods have the advantage that they can be implemented on commercially available modules so that implementation can be achieved inexpensively.

In a further embodiment, the communication connection is established on the basis of a wireless connection or a wire-bound connection. When a wire-bound connection is used, it is simple to implement the connection in a fail-safe way, i.e. with few transmission errors, and in a tap-proof way. On the other hand, when a wireless connection is used, it is possible to employ known radio technology permitting simple and inexpensive integration and implementation of the wireless connection.

In a specific embodiment of the communication connection, this is created on the basis of at least one second partial connection of the charging connection, wherein the at least one partial connection is embodied for the transmission of energy for charging the memory unit. For example, a charging cable with a plurality of out-of-phase external conductors is used for the connection of the first or second station. It is of advantage to implement the communication connection via one of these external conductors, since, on the one hand, no further connections need be established between the first and second stations, e.g. implementation can be achieved inexpensively by the use of a further cable and by the use of existing components. The communication connection is started using the identifier, which enables a unique assignment to the first and second stations even if significant interference is present, e.g. due to electromagnetic irradiation from other charging cables.

The identifier may be transmitted in encoded form, which increases security during communication between the first and second stations.

The first partial connection may transmit key information which helps to increase the communications security for the communication to be started. This key information is used, for example during the continuous information exchange over the communication connection after the start of the communication in order to be able to send the information to be transmitted safely.

Some embodiments provide a transmission system for establishing communication between a first station and a second station, wherein the first station is connected directly to the second station via a charging connection for charging or discharging a memory unit of the second station, with a first partial connection of the charging connection for the transmission of at least one identifier, wherein the identifier identifies the first station and the second station as communication partners for communication, with a communication connection for performing the communication between the first station and the second station, wherein the communication can be started after reception of the identifier ID by the first station or by the second station, wherein the first partial connection and the communication connection are different physical connections.

The advantages may be similar to those of the method corresponding to the transmission system.

The transmission system can also comprise at least one first means embodied to carry out one or more method steps. Here, the advantages are similar to those of the method steps carried out.

Some embodiment provide a first station for establishing communication between a first station and a second station, wherein the first station is connected directly to the second station via a charging connection for charging or discharging a memory unit of the second station, with a second means for the transmission of at least one identifier via a first partial connection of the charging connection, wherein the identifier identifies the first station and the second station as communication partners for communication, and for performing the communication between the first station and the second station via a communication connection, wherein the communication can be started after reception of the identifier by the first station or by the second station, wherein the first partial connection and the communication connection are different physical connections.

The advantages of the first station may be similar to those of the method.

The first station also comprises at least one third means embodied to carry out one or more method steps. Here, the advantages are similar to those of the embodiments according to the respective method steps.

Finally, some embodiment provide a second station for establishing communication between a first station and a second station, wherein the first station is connected directly to the second station via a charging connection for charging or discharging a memory unit of the second station, with a fourth means for the transmission of at least one identifier via a first partial connection of the charging connection, wherein the identifier identifies the first station and the second station as communication partners for communication, and for performing the communication between the first station and the second station via a communication connection, wherein the communication can be started after reception of the identifier by the first station or second station, wherein the first partial connection and the communication connection are different physical connections. The advantages of second station are similar to those of the method. In addition, the second station can comprise at least one fifth means embodied to carry out one or more method steps. The advantages of this expanded configuration are similar to those of the method steps.

FIG. 1 shows an example charging situation in which an electric vehicle, represented by a second station S2, is to be connected to a charging column, represented by the first station S1, by means of a charging connection VL, which can be embodied as a charging cable. To this end, a user inserts a plug PLG, see FIG. 2, attached at the end of the charging cable, into an insertion device provided on the electric vehicle, thus establishing a physical connection between the electric vehicle and the charging column. The charging connection VL of the charging cable can, for example, be embodied on the basis of the standard IEC 61851-1, Annex A. The charging connection is used to charge or discharge a battery BAT of the second station S2. Further statements refer partially to this standard, wherein embodiments of the invention are not restricted to this standard.

Figure 2:
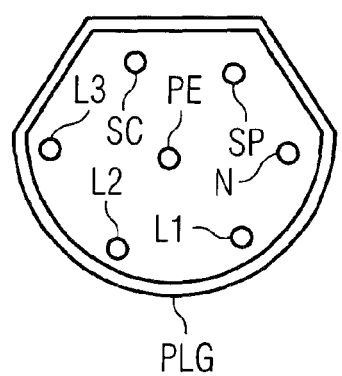
FIG. 2 illustrates an example plug for a charging connection.

FIG. 2 shows an example of a plug with a plurality of contacts. The function of the individual contacts was explained in more detail above in the introduction. When a user has inserted the plug PLG in a matching socket on the electric vehicle, the signal conductor SP displays an operating mode 3. This operating mode 3 means that the electric vehicle is to be charged and additionally, i.e. in parallel, communication is to be established between the charging column and the electric vehicle. During this signaling, also called "low level" signaling, the charging column informs the electric vehicle of at least one identifier ID with which the electric vehicle and the charging station can be identified as communication partners for a communication to be performed subsequently. In the present case, the charging station transmits an IP address (IP=Internet Protocol), which was specified by IETF (IETF=Internet Engineering Task Force). The electric vehicle uses this IP address to identify the IP network in which it is located so that, within the IP network, data can be unambiguously exchanged between communication partners, that is the charging column and the electric vehicle. Then, the broadband communication is started via one of the phases LI, L2, L3 with the aid of PLC technology. Within the scope of PLC technology, the IP address transmitted as an identifier is then used to exchange data between the charging column and the electric vehicle.

FIG. 3 shows that a first partial connection VT1, which in an example embodiment is implemented by the signal conductor SP, can be used to achieve an exchange of the at least one identifier ID, for example the IP address ADR. Subsequently, a broadband communication connection is started via a second partial connection VT2, wherein this second partial connection VT2 performs the communication connection VK via one or more of the outer conductors LI, L2, L3 provided for the transmission of energy E for charging or discharging the memory unit BAT of the electric vehicle.

In an alternative, the identifier ID is transmitted in the form of a MAC address (MAC=Media Access Control) from the electric vehicle to the charging station after the connection of the charging cable via the signal line SP of the charging cable. Then, broadband communication can take place via at least one of the outer conductors LI, L2, L3 with the aid of the MAC address. Alternatively, the charging station can assign an IP address to the received MAC address which is transmitted for establishing and operating the communication to the electric vehicle, for example via the signal line SP. Subsequently, the broadband communication can take place with the aid of PLC technology via one of the outer conductors.

FIG. 3 also shows the first station S1 with a second means M2, wherein the second means enables at least the first partial connection and alternatively and additionally the second partial connection to be controlled and used to exchange the identifier or to start the communication. In addition, the first station S1 can comprise at least one third means M3 to enable extensions of the first station to be implemented and carried out. FIG. 3 also shows a fourth means M4 of the second station S2, wherein the fourth means is embodied such that it enables at least the first partial connection and optionally additionally the second partial connection to be controlled and used to exchange the identifier or start the communication. In addition, the second station S2 can comprise at least one fifth means M5, with which expanded configurations of the second station can be implemented and carried out.

FIG. 4 shows an alternative embodiment. Here, FIG. 4 differs from FIG. 3 in that the communication connection VK is not implemented by a second partial connection VT2 of the charging connection VL, but by an additional connection, in the present case in the form of a wireless connection. This wireless connection is based, for example, on a standard Bluetooth or WLAN (WLAN=Wireless Local Area Network).

In a further embodiment, the charging connection VL is implemented not by a charging cable with a plurality of partial connections but by inductive coupling between the first and the second station. Here, conductors, which, in the case of the charging cable, are implemented by the signal conductor SP and one of the outer conductors LI, L2, L3, are transmitted, for example, by a frequency-modulated signal. Hence, once again, in this alternative, the first partial connection and the communication connection have different physical connections, since for example different frequency spectra or other different types of modulation are used enabling different physical connections for the first partial connection and the communication connections.

In an alternative embodiment, the first partial connection of the charging connection is embodied for the transmission of energy for charging or discharging the memory unit.

FIG. 5 shows examples of individual method steps for performing the method for establishing communication, according to an example embodiment. The flowchart is started in status STA. In a first step XI, the charging station checks, for example, whether a physical connection with the electric vehicle has been established, for example with the aid of the control conductor SC. If this is not the case, the flowchart is completed with status END. This path is identified by "N". Otherwise, the flowchart is continued via path "J" and X2 performed as the second step. In this step, the charging station transmits the at least one identification ID for the identification of the communication partners participating in the communication, represented by the first station S1 and the second station S2. After receiving the identifier ID, the second station S2 starts broadband communication on the outer conductor LI on the basis of the PLC method or another communication method. This is represented in the flowchart by the third step X3. The flowchart finishes in the step END. In an alternative, signaling on the signal conductor is also monitored in step XI. Only when a pre-specifiable operating mode, e.g. mode 3, has been identified is the state diagram continued in the path "J".

The first station, the second station and the transmission system SYS and the individual components and means thereof can be implemented and executed in hardware or software or in a combination of software and hardware. In particular, the implementation of various embodiments and the components and stations thereof can be executed by a processor such that the processor reads a program code from a non-transitory memory coupled thereto with the aid of which individual steps of various embodiments can be executed or components, such as the first and second station, can be controlled.

What is claimed is:

1. A method for establishing an information communication between a first station and a second station connected directly to the first station via a charging connection for charging or discharging a memory unit of the second station, comprising:

transmitting at least one identifier between the first station and the second station via a first partial connection of the charging connection, wherein the first partial connection of the charging connection is defined by a first physical connection between the first station and the second station, and wherein the identifier identifies the first station and the second station as communication partners for the information communication, and after receiving said identifier, starting the information communication between the first station and the second station using the identifier via an information communication connection for performing an exchange of information between the first station and the second station, wherein the information communication connection comprises a different physical connection than the first physical connection for transmitting least one identifier between the first station and the second station.

2. The method of claim 1, wherein the identifier is transmitted from the first station to the second station.

3. The method of claim 1, wherein the identifier is transmitted from the second station to the first station.

4. The method of claim 1, wherein the identifier is created in the form of an address of at least one of the first station and the second station.

5. The method of claim 4, wherein the address is created in the form of an IP address, a service set identification, a MAC address, or a network segment address.

6. The method of claim 1, wherein the identifier is transmitted after the establishment of the charging connection.

7. The method of claim 1, wherein the first partial connection of the charging connection is established on the basis of a pulse-width modulated signal, a frequency-modulated signal, an amplitude-modulated signal, or a phase-shift-key modulated signal.

8. The method of claim 1, wherein the information communication connection is established on the basis of a wireless connection or a wire-bound connection.

9. The method of claim 1, wherein the information communication connection is created on the basis of at least one second partial connection of the charging connection that is physically distinct from the first partial connection of the charging connection, wherein the at least one second partial connection of the charging connection is configured to transmit energy for charging or discharging the memory unit, in addition to performing the information communication between the first station and the second station.

10. The method of claim 1, wherein the identifier is transmitted in encoded form.

11. The method of claim 1, wherein key information is transmitted via the first partial connection.

12. A transmission system for establishing an information communication with a first station and with a second station connected directly to the first station via a charging connection to charge or discharge a memory unit of the second station, comprising:

a first partial connection of the charging connection configured to transmit at least one identifier between the first station and the second station, Wherein the first partial connection of the charging connection is defined by a first physical connection between the First station and the second station, and wherein the identifier identifies the first station and the second station as communication partners for the information communication, and an information communication connection between the first station and the second station configured to carry the information communication between the first station and the second station, wherein the information communication can be started after receiving the identifier by the first station or by the second station using the identifier, and wherein the information communication connection comprises a different physical connection than the first physical connection for transmitting at least one identifier between the first station and the second station.

13. The transmission system of claim 12, wherein the first partial connection of the charging connection is established on the basis of a pulse-width modulated signal, a frequency-modulated signal, an amplitude-modulated signal, or a phase-shift-key modulated signal.

14. The method of claim 1, wherein the memory unit of the second station is a battery.

15. A method for establishing communication between a first station and a second station connected directly to the first station via a charging connection for charging or discharging a memory unit of the second station, comprising:

transmitting at least one identifier via a first partial connection of the charging connection wherein the identifier identifies the first station and the second station as communication partners for communication and after receiving said identifier starting the communication using the identifier via a communication connection for performing the communication between the first station and the second station, wherein the communication connection is created on the basis of at least one second partial connection of the charging connection that is physically distinct from the first partial connection of the charging connection, wherein the at least one second partial connection of the charging connection is configured to transmit energy for charging or discharging the memory unit, in addition to performing the communication between the first station and the second station, and wherein at least one physical connection of the second partial connection used for both carrying the communication between the first station and the second station and for charging or discharging the memory unit of the second station comprises an outer conductor.

16. A method for establishing communication between a first station and a second station connected directly to the first station via a charging connection for charging or discharging a memory unit of the second station, comprising:

transmitting at least one identifier via a first a partial connection of the charging connection, wherein the identifier identifies the first station and the second station as communication partners for communication, and after receiving said identifier, starting the communication using the identifier via a communication connection for performing the communication between the first station and the second station, wherein the communication connection s created on the basis of at least one second partial connection of the charging connection that is physically distinct from the first partial connection of the charging connection, wherein the at least one second partial connection of the charging connection is configured to transmit energy for charging or discharging the memory unit in addition to performing the communication between the first station and the second station, and wherein transmitting energy between the first station and second station via the second partial connection of the charging connection to charge or discharge the memory unit of the second station comprises transmitting three-phase power via the second partial connection of the charging connection.

\* \* \* \* \*